Oct. 4, 1932.  I. DOROGI ET AL  1,881,048
INFLATABLE HOLLOW RUBBER ARTICLE AND PROCESS FOR ITS PRODUCTION
Filed Jan. 7, 1931  2 Sheets-Sheet 1

Oct. 4, 1932.  I. DOROGI ET AL  1,881,048

INFLATABLE HOLLOW RUBBER ARTICLE AND PROCESS FOR ITS PRODUCTION

Filed Jan. 7, 1931   2 Sheets-Sheet 2

Inventors
Istvan Dorogi
Lajos Dorogi
by Mock & Blum
attorneys

Patented Oct. 4, 1932

1,881,048

UNITED STATES PATENT OFFICE

ISTVÁN DOROGI AND LAJOS DOROGI, OF BUDAPEST, HUNGARY, ASSIGNORS OF ONE-HALF TO DR. DOROGI & CO. RUBBER GOODS FACTORY LTD., OF BUDAPEST-ALBERTFALVA, HUNGARY

INFLATABLE HOLLOW RUBBER ARTICLE AND PROCESS FOR ITS PRODUCTION

Application filed January 7, 1931, Serial No. 507,153, and in Hungary October 20, 1930.

This invention relates to inflatable hollow rubber articles, especially toys, composed of two or more flat covering sheets and of at least one insertion piece formed of two flat sheets joined at the edges with the edges of the covering sheets, such as are, for example, described in United States patent specification No. 1,504,079 and in German patent specifications Nos. 452,512, 452,805 and 476,165.

The body shape of such figures which they acquire when inflated, is determined solely by the outline and dimensions of the individual sheets which are parallel in the uninflated condition of the figure, and is consequently limited by the same.

The object of the present invention is to increase the variety of the shapes of these figures. For this purpose and in order to effect a substantial alteration in the relative positions of the combined sheet edges and in the shape of the figure, the inner surfaces of the covering sheets are joined to the adjacent inner surfaces of the insertion piece or pieces in such a way that these joining pieces divide the internal space or cavity of the figure into several intercommunicating hollow spaces.

Figure 1:
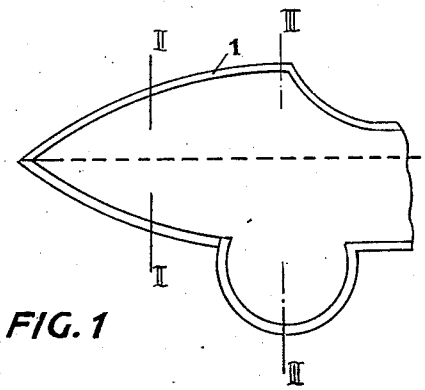
Figure 2:
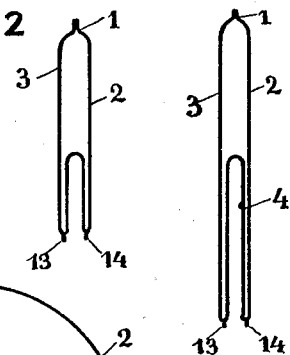
Figure 3:
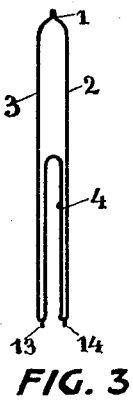
Figure 4:
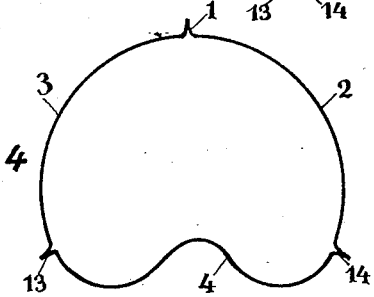
Figure 5:
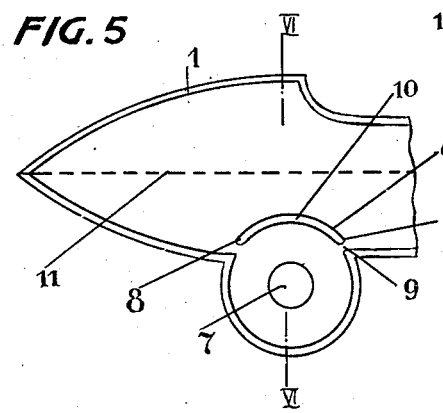
Figure 6:
Figure 7:
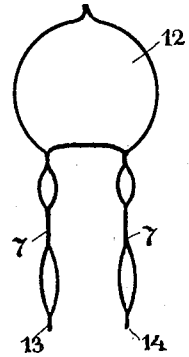
Figure 7A:
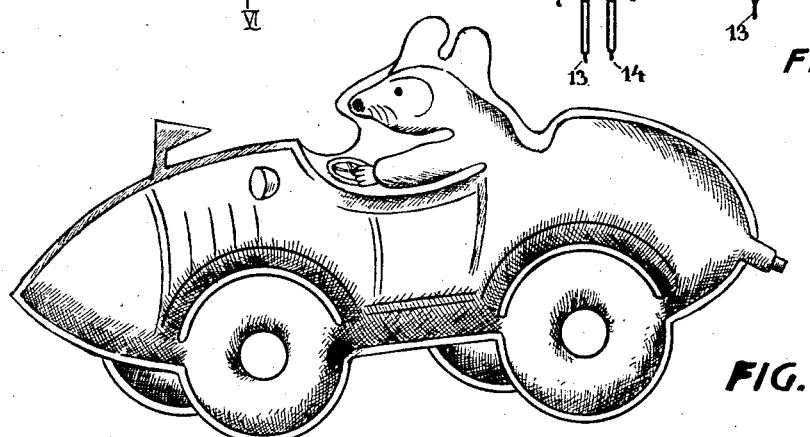
Figure 8:
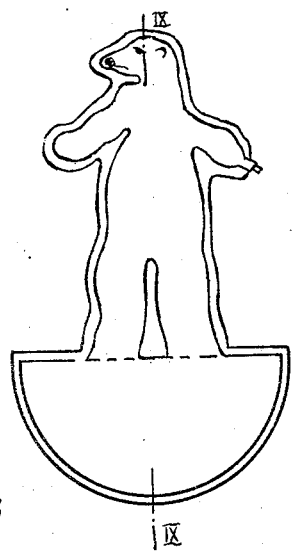
Figure 9:
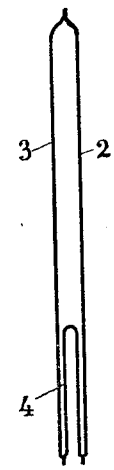
Figure 10:
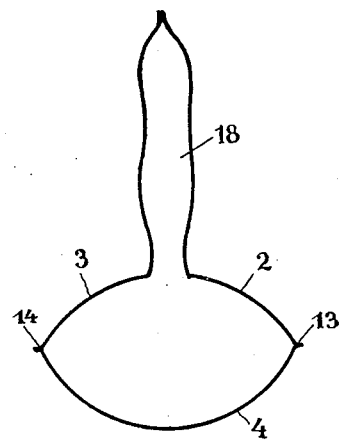
Figure 11:
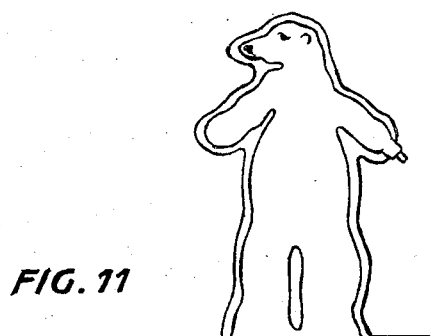
Figure 12:
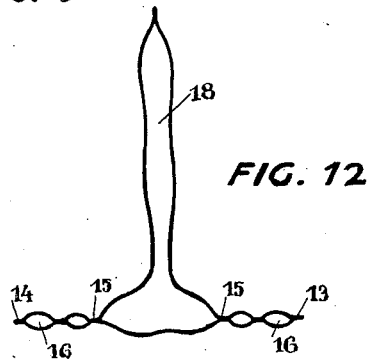
Figure 13:
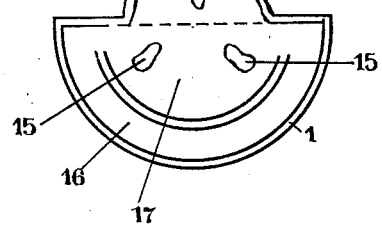
Figure 13:
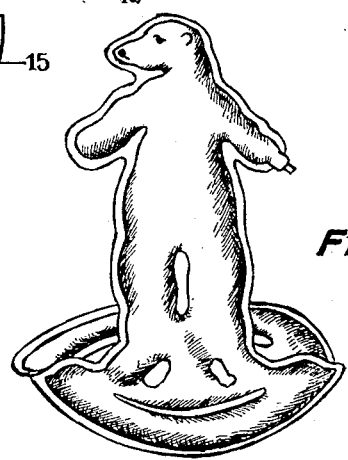

Two embodiments of the invention are illustrated in the accompanying drawings, wherein:

Figure 1 is a side elevation of the front half of an inflatable rubber article made in accordance with United States Patent No. 1,504,079, Figures 2 and 3 are cross-sections of the article in the relaxed condition along the lines II—II and III—III of Figure 1, Figure 4 is a cross-section of the article along the line III—III of Figure 1 after inflation, Figure 5 is a side elevation of the same article with the modifications according to the invention, Figures 6 and 7 are cross-sections along lines VI—VI of Figure 5 in the uninflated and inflated conditions respectively, Figure 7a is a perspective view of the inflated article, Figure 8 is a side elevation of another inflatable rubber article also made in accordance with United States Patent No. 1,504,079, Figures 9 and 10 are corresponding cross-sections showing the figure uninflated and inflated respectively, Figure 11 is the side elevation of the same figure with the modifications according to the invention, and Figures 12 and 13 are cross-sectional and perspective views respectively of the inflated figure.

The article shown in Figures 1–4 is formed in known manner by joining the edges of the covering sheets 2 and 3 and the edges of the insertion sheet 4, which latter is simply folded upon itself. Figure 4 shows that the cross-sectional shape of the inflated article depends entirely on the outline shape of the individual sheets 2, 3 and 4 joined by the seams 1.

However, the inner surfaces of the covering sheets 2 and 3 may be joined, in accordance with the invention and as shown in Figures 5 and 6, to the surfaces of the insertion piece 4 at the zones 6 and 7 so that, for example, a space 9 is left between the ends of the connecting zones 6 and the edges of the sheets. The article would now have, when inflated, a cross section according to Figure 7, which differs very substantially from the cross-section according to Figure 4 in that a circular hollow space connected with the internal cavity of the article by the spaces 9, is formed by the two connecting zones 6 and 7. This space, when inflated, forms a reasonably good representation of a motor car wheel. The fact that the apex 10 of the connecting zone 6 lies only a short distance from the fold 11 of the insertion piece 4, very substantially decreases the cross-section of the upper hollow space 12 of the article, whereby the upper portion of the article also acquires a shape resembling a motor car. On comparing the cross-sections, Figures 4 and 7, it will be appreciated that the joining of portions of the inner surfaces of the insertion sheet or sheets to the covering sheets according to the invention also very substantially modifies the relative position of the edges 13 and 14.

Figures 8–10 show, in a manner similar to Figures 1–4 another article also constructed in known manner from two covering sheets and one folded insertion piece. Figure 10 shows that such an article cannot stand upright or float without support, but must fall over. If, however, the insertion piece 4 is joined to the covering sheets 2 and 3 at places 15, in accordance with the invention, the circular portion, which remains free between the edges 13 and 14 of the sheets when inflated and the points or zones of junction 15, forms a floating ring 16 which is joined by several small narrow air passages to the upper hollow space or internal cavity 18 of the article. It will be readily apparent that the joining of portions of the insertion sheet to the covering sheets according to the invention has substantially altered not only the shape, but also the stability of the figure shown in Figures 8–10.

Thus, two simple examples prove conclusively that the invention enables hitherto unthought of possibilities as regards the shape of inflatable rubber articles to be effected by simply joining together flat sheets and without the cost of the article being appreciably increased. If the article is produced from powdered sheets, it is merely necessary before joining the sheets together to apply an adhesive, for example, rubber solution to the parts of the surfaces to be joined. After assembling the sheets this causes these sheets to stick together at the requisite places.

The joining together of the sheets according to this invention, in cases in which, as in German patent specification No. C 21, the raw unpowdered sheets are joined by inserting suitably cut separating templates, made for example of paper for preventing the inner surfaces of the article from sticking together, can be effected much more simply. In this case separating templates are used which are cut out, as for example by stamping, at the places corresponding to the point or zone of connection according to the invention.

Having now particularly described and ascertained the nature of our said invention and in what manner the same is to be performed, we declare that what we claim is:

1. A method of producing a hollow and inflatable rubber article from a pair of outer sheets and a pair of intermediate rubber members, which consists in connecting the edges of the outer sheets to each other and also connecting said intermediate members to the corresponding edge portions of the outer sheets, and also connecting a part of each intermediate member to the corresponding outer sheet, so that the internal space of the article is divided into a plurality of interconnected spaces.

2. A method of producing a hollow and inflatable rubber article from a pair of outer sheets and a pair of intermediate members, which consists in connecting the edges of the outer sheets to each other and also connecting said intermediate members to the corresponding edge portions of the outer sheets, and also connecting a part of each intermediate member to the corresponding outer sheet, so that the internal space of the article is divided into a plurality of interconnected spaces, said rubber sheets and rubber members being raw and unpowdered and said rubber members and said sheets being simultaneously joined to each other at all points of connection.

3. A method of producing a hollow and inflatable rubber article from a pair of outer sheets and a pair of intermediate rubber members, which consists in connecting the edges of the outer sheets to each other and also connecting said intermediate members to the corresponding edge portions of the outer sheets, and also connecting a part of each intermediate member to the corresponding outer sheet, so that the internal space of the article is divided into a plurality of interconnected spaces, said rubber members and said sheets being raw and unpowdered and said members and said sheets being simultaneously joined to each other at all points of connection, said members and sheets, when assembled, being separated save at the points to be connected.

4. An inflatable and hollow rubber article, consisting of at least two outer sheets, and at least one insertion piece having separated layers, the edges of said sheets being connected to each other, separated areas of said insertion piece being respectively connected to the corresponding portions of the outer sheets, so that the internal cavity of the article is divided into a plurality of cavities.

5. An inflatable and hollow rubber article, consisting of at least two outer sheets, and at least one insertion piece having separated layers, the edges of said sheets being connected to each other, separated areas of said insertion piece being respectively connected to the corresponding portions of the outer sheets, so that the internal cavity of the article is divided into a plurality of cavities, said cavities being connected with each other.

6. An inflatable and hollow rubber article, consisting of at least two outer sheets, and at least one insertion piece having separated layers, the edges of said sheets being connected to each other, separated areas of said insertion piece being respectively connected to the corresponding portions of the outer sheets, so that the internal cavity of the article is divided into a plurality of cavities, said connected areas being at the base of the figure, so that said base is formed to be self-supporting.

In witness whereof we have hereunto set our hands this 13 day of December, 1930.

ISTVÁN DOROGI.
LAJOS DOROGI.